March 26, 1946. C. E. HEMMINGER 2,397,352
CHEMICAL PROCESS
Filed Oct. 11, 1941
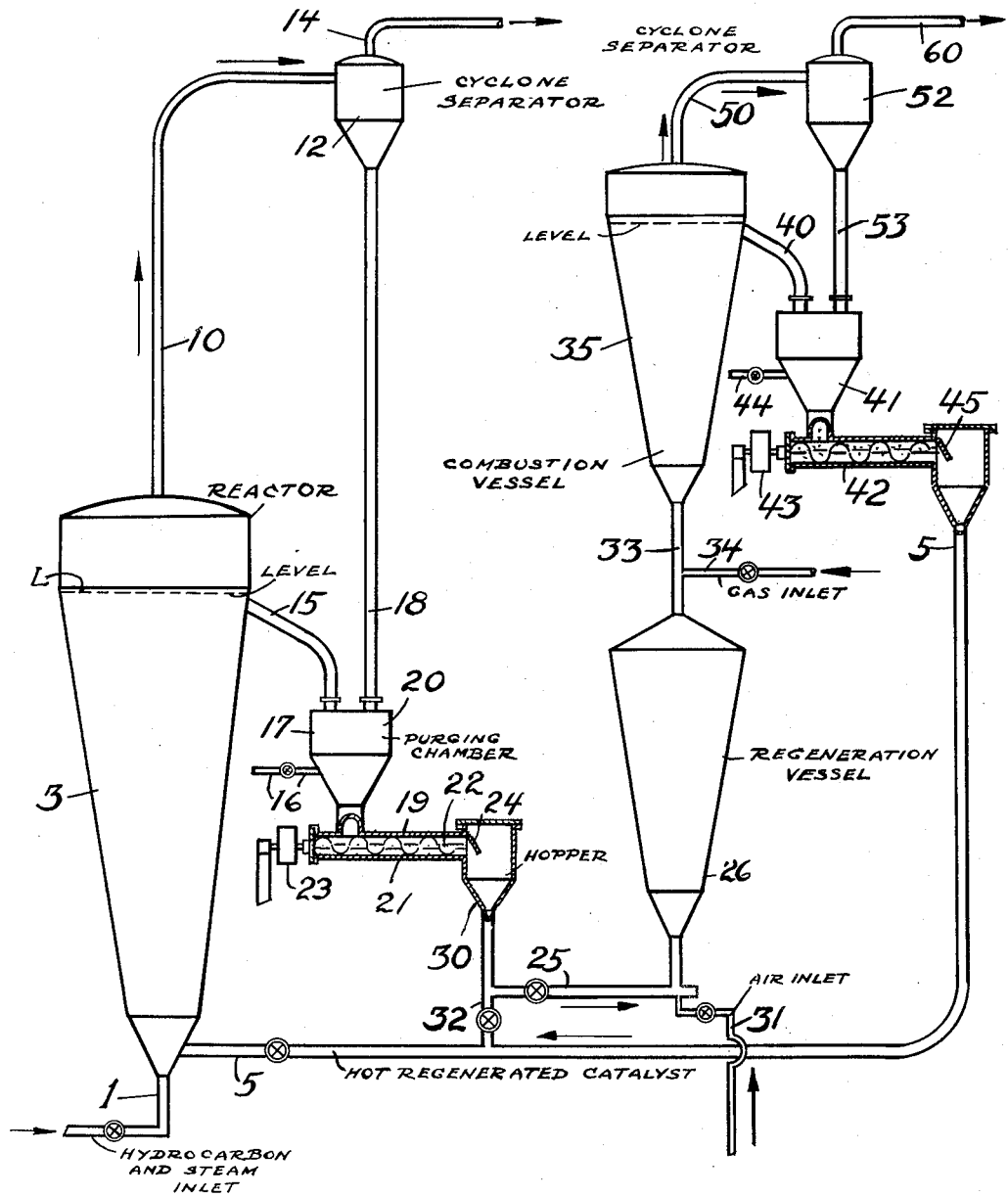
Charles E. Hemminger Inventor
By [signature] Attorney Patented Mar. 26, 1946

2,397,352

UNITED STATES PATENT OFFICE 2,397,352

CHEMICAL PROCESS

Charles E. Hemminger, Westfield, N. J., assignor to Standard Oil Development Company, a corporation of Delaware Application October 11, 1941, Serial No. 414,560

3 Claims. (Cl. 260—683.3)

The present invention relates to the dehydrogenation of hydrocarbons catalytically, in a continuous manner and employing a catalyst in powdered form.

Recently, the dehydrogenation of hydrocarbons has acquired considerable importance in the industrial arts. For instance, the preparation of certain rubber substitutes involves as a starting material butadiene, and since the occurrence of this compound in industrial processes, such as petroleum oil refining, is not large, it has become important to devise new methods for preparing it. The most suitable method for preparing butadiene, up to the present time, involves a two-stage dehydrogenation of normal butane, in a first stage to butene and in a second stage to butadiene.

One object of the present invention is to devise a continuous process for dehydrogenating hydrocarbons to obtain maximum yields of desired products.

An important, more restricted, object of the present invention is to dehydrogenate butane to form butylene, which can then be dehydrogenated to butadiene by various known methods, under operating conditions most favorable for the maximum production and recovery of butylene from a given amount of butane.

In the accompanying drawing, I have shown diagrammatically a flow plan illustrating my invention, and I shall refer to the drawing in describing my improvements as applied to the dehydrogenation of butane, with the understanding that the specific details I am about to enumerate are purely illustrative and do not constitute a limitation on my invention.

In order that my invention may be best understood, I wish to state briefly at the outset, the features of my invention which I deem most important. They are as follows:

(1) The use of a conical shaped reactor, which is preferred, because the said reactor permits constant gas velocities to be maintained therein in spite of the increase in gas volume due to the reaction.

(2) Heating of the catalyst in a separate heating zone to supply heat in addition to that imparted to the catalyst during its regeneration and then recirculating the catalyst to the reactor where its sensible heat is employed to support, at least in part, the dehydrogenation reaction.

Now referring in detail to the drawing, butane, say at a temperature of 800° F. is discharged into the system through line 1 and thence discharged into the bottom of conical shaped reactor 3. Simultaneously hot regenerated catalyst is discharged into the reactor through line 5, the catalyst in line 5 being dispersed or suspended in steam or other gas. The catalyst is preferably in the form of a powder having a particle size of from 50–400 mesh, with a particle size such that about 95% passes through a 300 mesh screen being preferred. The catalyst itself may be chromic oxide supported on alumina or magnesia with or without the inclusion of promoters as CuO, $K_2O$ and $Ce_2O_3$, etc. These and other suitable catalysts, per se, are known in the prior art. Within the reactor, the catalyst and reactant pass upwardly. The gas velocities are regulated so as to lie within the range of from about 0.5 to 5 ft./second, with about 1.5 ft./second being preferred. At these velocities the catalyst will not flow through the reactor at the same rate as the gases but will, on the other hand, be in a sort of turbulent or ebullient state.

It is pointed out also that the feed to the reactor is in the ratio of from about 0.5–10 lbs. of butane per hour per pound of catalyst in the reactor, with about 2 lbs. of butane per hour to 1 lb. of catalyst in the reactor preferred. Also, the temperature conditions are so regulated that the butane is at a temperature within the range of from about 900°–1200° F. The temperature conditions are attained in part by preheating the incoming butane in a furnace or the like and in part by using catalyst having a greater degree of heat than the butane at the point of contact.

The reaction products are withdrawn from the reactor through line 10 and discharged into a cyclone separator 12. The gas in line 10 does not contain the main body of the catalyst (it contains about 0.025 pound of catalyst per cubic foot of gas), since that main body remains within the reactor as will presently be explained. The reaction product separated from entrained catalyst is withdrawn from cyclone separator 12 through line 14 and is then sent to recovery equipment where the butylene is separated as a product from butane and other gases which later are recycled to the reactor. It is usually preferable to employ two or more cyclones and an electrical precipitator in order to separate the catalyst from the reaction products completely.

The main body of the catalyst in the reactor has a dense phase upper level at L and the catalyst is withdrawn from the reactor through line 15, is purged in vessel 17 with steam from line 16 and then discharged into a pump 19. The pump 19 carries a superposed hopper 20 into which pipes 15 and 18 discharge catalyst. The pump consists of a casing 21 in which a shaft 22 is axially disposed. Shaft 22 carries a plurality of securely mounted flights or vanes 21 and a pulley 23 is carried on a projection of the shaft 22. Any suitable driving means may be used to drive the shaft through the pulley, such as an electric motor. A flap valve 24 is disposed at the discharge end of pump 19 and the pump discharges into a hopper 30, from whence the catalyst passes into line 32 and thereafter into line 5 as shown. It is possible to build up a pressure in line 32 by rotating the shaft of pump 19 at high speed, say at about 1500 revolutions per minute. That is to say, the purpose of using the pump is to increase the pressure of the suspension in line 30 above atmospheric. As shown in the drawing, the catalyst recovered from the cyclone separator 12 through line 18 is also discharged into the pump 19. The steam or other gas forms a conveying or transport medium for the powdered catalyst. The suspension then is withdrawn through line 30 and either recycled through line 32 into confluence with regenerated catalyst in line 5 for return to the reactor, or conducted through line 25 to a conical shaped regeneration vessel 26 where it may be treated with air, in a manner presently to be described, in order to remove by combustion, carbonaceous material deposited thereon during the reaction in vessel 3. Air necessary for the regeneration of the catalyst is introduced into the system through line 31, and this air stream is discharged into line 25 and thereafter with the catalyst into regeneration vessel 26 where the carbonaceous deposits on the catalyst are consumed by combustion. The flow of catalyst and regeneration gas in regeneration vessel 26 is concurrently upward, and this condition may prevail with a particle size of catalyst of the order mentioned when the gas velocities are 1-10 ft./second, although there is a limited but appreciable amount of slippage of the particles in the gas stream.

The regenerated catalyst at a temperature of about 1050 to 1100° F. and the gaseous combustion products are withdrawn from regenerator 26 through line 33 and therein mixed with a combustible gas such as methane, natural gas, or the like, and air, or the like, introduced through line 34 and the mixture is then discharged into a combustion vessel 35 similar in shape to vessels 3 and 26, that is to say, conical shaped. In vessel 35, the combustion of the added gas releases heat which is absorbed in part at least by the catalyst, further heating the same to temperatures of 1300 to 1600° F., with about 1400° F. desired. As in the case of reactor 3, the gas velocities in combustion vessel 35 are regulated within the range of 0.5 to 5 ft./second. Also, the main body of the catalyst is drawn off from the side of the reactor through outlet pipe 40 and discharged into a pump 42, similar to pump 19, where it is fluidized by mixing with steam or other gas from line 44. The gases are withdrawn from the combustion chamber 35 through line 50 and discharged into a cyclone separator 52 where entrained catalyst is removed and discharged through line 53 into pump 42. The flue gases are withdrawn from the cyclone separator through line 60, and these gases may be delivered to one or more cyclone separators or Cottrell precipitator to remove the last traces of catalyst, and thereafter the gases may be passed through a waste heat boiler or turbine engine to recover at least a portion of their energy content. The regenerated catalyst which has also been heated in combustion chamber 35 to the temperatures stated is returned through line 5 to reaction vessel 3, and the cycle of operations is completed.

As previously indicated, it is not necessary in the dehydrogenation of butane to regenerate the catalyst after each passage through the reaction zone and, consequently, unregenerated catalyst amounting to 100 to 1000% of the regenerated catalyst supplied to the reaction vessel through line 5 may be returned through line 32 to the reactor without regeneration. Where a large portion of the catalyst is returned to the reactor without regeneration, the catalyst may be considerably cooled, since the dehydrogenation reaction is a heat absorbing reaction or, in other words, it is endothermic. Hence in my present invention, I have provided a catalyst heating chamber for supplying heat to the system to compensate for that lost in the dehydrogenation reaction and to preheat, at least in part, the butane to raise its temperature to reaction temperatures. Furthermore, the amount of combustible carbonaceous material deposited upon the catalyst is in the order of .1 to 3.0% of feed and is usually insufficient to supply enough heat by combustion thereof to maintain the reaction mass in the reaction zone at reaction temperatures. In other words, it is often impossible to transfer sufficient heat from the regeneration zone to the reaction zone and to supply the deficiency I have, as previously explained, provided means for supplying additional heat to the system by burning a combustible gas in the presence of at least a portion of the catalyst, whereupon the catalyst absorbs sufficient heat, together with that recovered from the regeneration vessel, to support at least in substantial part the reaction taking place in the reaction zone. Instead of burning gases in combustion chamber 35, I may heat the catalyst with hot gaseous products of combustion from any source. Obviously instead of burning gas in the combustion chamber 35, I may burn a normally liquid material, such as naphthas, gasoline, and the like.

In order to transfer sufficient heat from the combustion chamber to the reactor, it is necessary to use a high catalyst to oil ratio, in the order of 5 to 20 lbs. of catalyst per pound of butylene, with 10 preferred. The catalyst fed to the reactor temperature will be at least 25° F. higher than the incoming gas stream before mixing with the heated catalyst. In other than an ebullient mass such as exists in reactor 3, the high catalyst temperature would cause localized overheating and "hot spots" but due to the thorough mixing in the reactor, the temperature therein is substantially uniform and the hot catalyst quickly gives it heat to the whole mass. An important function of the combustion vessel 35 in which the catalyst is heated with an external combustible gas is to condition the catalyst. In regenerator 26, in the presence of air, some of the metals of the catalyst are oxidized and, if introduced in this form in the reactor, they would oxidize the feed stock. However, a preferably reducing atmosphere is maintained in vessel 35 to reduce these metals during heating.

As to the catalyst employed by my process, as previously indicated these are well known, and include besides chromic oxide supported on alumina or magnesia, molybdenum oxide supported on alumina, vanadium oxide supported on alumina, and others, and, as is known in the prior art, these catalysts may be mixed with promoters such as copper oxides, ceria, potassium oxide, platinum or palladium.

As to operating conditions in the reactor, as previously indicated in the case of butylene production rather high temperatures are preferred, that is within the range of from 900–1200° F., with about 1000° F. preferred; pressure conditions are from subatmospheric to 500 lbs./sq. in. gauge, with say 10 lbs. per square inch gauge pressure usually preferred.

It will be understood that while I have described in detail the application of my invention as it relates to butadiene production, the same technique may be employed in the dehydrogenation of straight chain saturated and unsaturated and cyclo paraffins to form mono and polyolefins of any type or description.

Another important application of the invention is to produce butadiene by dehydrogenating butylene. My present invention, therefore, includes the dehydrogenation of butylene, but I wish to point out that in employing the velocities in the reactor set forth hereinbefore, it would be necessary to use a shallow reactor; in other words, the vertical height of reactor 3 should be small because the dehydrogenation of butylene is a reaction where there should be a short period of contact between the catalyst and the butylene to prevent decomposition of the butylene formed. Thus, the contact time between butylene and the catalyst is preferably below 1 second so that where the gaseous velocities were 1½ ft./second in the reactor, the said reactor should preferably be less than 1 ft. in height. However, the depth of the reactor is governed by the catalyst size, since higher velocities can be used with larger size catalyst. For instance, with catalyst of 20–50 mesh, the velocity can be 5–7 ft./second and the height of the reactor 4 to 6 feet. Again, steam or other diluent gases may be used to decrease the contact time of the gases. With 7 to 10 mols of steam per mol of butylene, the reactor is 15 to 20 feet high with the large size catalyst.

Many modifications of my invention will suggest themselves to those familiar with this art.

What I claim is:

1. The process of dehydrogenating hydrocarbons which comprises discharging the hydrocarbons, together with a powdered catalyst, into the bottom of a reaction zone whose lower portion is of a more restricted cross-sectional area than its upper portion, causing the hydrocarbons and the catalyst to flow concurrently upward in said reaction zone, withdrawing catalyst from the upper portion of said reaction zone passing it to a regeneration zone, regenerating the catalyst, conducting the catalyst from the regeneration zone into a zone containing a reducing gas undergoing combustion to heat the catalyst and returning the regenerated and heated catalyst to the reaction zone at a temperature higher than the temperature of the hydrocarbons introduced thereinto.

2. The process of dehydrogenating hydrocarbons continuously which comprises forming a suspension of a powdered dehydrogenation catalyst in a normally gaseous hydrocarbon, the catalyst being at a higher temperature than the said hydrocarbon, conducting the suspension into a reaction zone, maintaining the catalyst and the hydrocarbons within the reaction zone in the form of a dense, ebullient, fluidized mass by regulating the velocity of the vapors upwardly through said mass separating catalyst from the reaction products within the reaction zone, regenerating by combustion at least a portion of the separated catalyst in a regeneration zone, withdrawing the regenerated catalyst from the regeneration zone and discharging it into a heating zone, further heating said catalyst in the said heating zone in the presence of a reducing gas to a temperature higher than that prevailing in the regeneration zone and recirculating the thus heated catalyst to the reaction zone at a temperature above the temperature of the hydrocarbon introduced thereinto.

3. A continuous process for dehydrogenating normally gaseous hydrocarbons catalytically which comprises forming a suspension of catalyst in the hydrocarbon, causing the suspension to flow upwardly in a reaction zone with velocities such that the catalyst is maintained in the reaction zone in a turbulent, ebullient state, withdrawing the main body of the catalyst from the reaction zone at a point below that at which the products are withdrawn but above the point of original entry of the suspension, purging the thus withdrawn catalyst with steam, dividing the purged catalyst into two streams, regenerating one stream of the purged catalyst, conducting the regenerated catalyst into a zone containing a reducing gas undergoing combustion to heat the catalyst to a temperature above that prevailing in the regeneration zone, introducing the regenerated and heated catalyst to the reaction zone at a temperature at least 25° F. higher than the temperature of the hydrocarbons fed thereinto, and recycling the other stream of purged catalyst directly to the reaction zone without regeneration.

CHARLES E. HEMMINGER.